United States Patent Office 3,808,272
Patented Apr. 30, 1974

3,808,272
PREPARATION OF BIODEGRADABLE ALKANE SULFONAMIDES
Oliver C. Kerfoot, Allan J. Lundeen, and Carl D. Kennedy, Ponca City, Okla., and William A. Wentworth, Houston, Tex., assignors to Continental Oil Company, Ponca City, Okla.
No Drawing. Filed Aug. 9, 1971, Ser. No. 170,390
Int. Cl. C07c 143/74
U.S. Cl. 260—556 A                  16 Claims

ABSTRACT OF THE DISCLOSURE

The present invention relates to an improved method of preparing high quality biodegradable alkane sulfonamides from the alkane sulfonyl chloride reaction mixture obtained by reacting normal paraffin hydrocarbons with chlorine and sulfur dioxide under the action of ultraviolet light. By the present invention, the crude alkane sulfonyl chloride reaction mixture is stabilized by the removal of impurities therefrom and unreacted normal paraffin hydrocarbons are removed from the stabilized mixture. The mixture is then reacted with a nitrogen base compound taken from the class consisting of ammonia and amines to obtain high quality linear alkane sulfonamides.

BACKGROUND OF THE INVENTION

(1) Field of the invention

The present invention relates generally to the preparation of biodegradable alkane sulfonamides, and more particularly, but not by way of limitation, to an improved method of preparing high quality biodegradable alkane sulfonamides from the alkane sulfonyl chloride reaction mixture obtained when normal paraffin hydrocarbons are sulfochlorinated.

(2) Description of the prior art

High molecular weight straight chain alkane sulfonamides. either unsubstituted or substituted have a variety of uses. For example, alkane sulfonamides are useful in surfactant formulations utilized in foam stabilizers, softeners, textile processing agents, etc., and because they are formed from straight chain alkane compounds, i.e., linear compounds, they are biodegradable. Alkanol substituted alkane sulfonamides form excellent hardness-resistant detergents of high surface actiivty.

Biodegradable alkane sulfonamides have heretofore been produced by reacting a nitrogen base compound such as ammonia or amine with the sulfonyl chloride reaction mixture obtained by reacting a paraffin hydrocarbon with chlorine and sulfur dioxide under the action of ultraviolet light (sulfochlorination). The liquid reaction mixture produced by sulfochlorination is comprised of hydrocarbon monosulfonyl clorides, disulfonyl chlorides and various polysulfonyl chlorides as well as unreacted hydrocarbons, halogenated hydrocarbons and other by-product impurities. Additionally, the reaction mixture contains dissolved hydrogen chloride, sulfur dioxide and chlorine. Because the crude sulfochlorination reaction mixture is unstable and contains appreciable quantities of impurity materials in solution, it is badly discolored and precipitates sediment upon aging. Consequently, the derivative sulfonamides are of generally poor quality. By the present invention, an improved method of preparing biodegradable alkane sulfonamides from the sulfochlorination reaction mixture is provided wherein the sulfonamides are of high quality.

SUMMARY OF THE INVENTION

The present invention relates to a method of preparing high quality biodegradable alkane sulfonamides comprising the steps of reacting a normal paraffin hydrocarbon containing from about 8 to about 20 carbon atoms with chlorine and sulfur dioxide under the action of ultraviolet light to form a reaction mixture containing a major portion of alkane monosulfonyl chlorides, a minor portion of alkane disulfonyl chlorides and polysulfonyl chlorides, unreacted paraffin hydrocarbons and impurity compounds. Impurity compounds are removed from the reaction mixture thereby stabilizing the mixture, and unreacted paraffin hydrocarbon is removed from the mixture. The resulting mixture of alkane sulfonyl chlorides is reacted with a nitrogen base compound selected from the group consisting of ammonia and amines to obtain a high quality product mixture comprised of linear alkane sulfonamides.

It is, therefore, a general object of the present invention to provide an improved method of preparing biodegradable alkane sulfonamides.

A further object of the present invention is the provision of an improved method of preparing high quality biodegradable alkane sulfonamides from the reaction mixture obtained by reacting normal paraffin hydrocarbons with chlorine and sulfur dioxide under the action of ultraviolet light.

Yet a further object of the present invention is the provision of an improved method of preparing high quality unsubstituted alkane sulfonamides, alkyl substituted alkane sulfonamides and alkanol substituted alkane sulfonamides.

Other objects, features and advantages of the invention will be apparent from the more detailed description given hereafter.

DESCRIPTION OF THE PREFERRED EMBODIMENTS

It is known that the liquid reaction product mixture obtained by the combined reaction of sulfur dioxide and chlorine with an alkane hydrocarbon compound having at least five carbon atoms contains a variety of sulfonyl chloride compounds. Specifically, the sulfonyl chloride substituent may attach to the alkane molecule at any point along the chain. Further, one or more sulfonyl chloride substituents may attach to the same alkane molecule. Thus, various isomers of alkane monosulfonyl chlorides, disulfonyl chlorides, trisulfonyl chlorides, etc., are formed. The monosubstituted alkane sulfonyl chloride compounds are less polar than the disubstituted and polysubstituted compounds.

The crude liquid reaction mixture comprised of monosulfonyl chlorides, disulfonyl chlorides and polysulfonyl chlorides obtained from the above-described reaction, includes unreacted hydrocarbons, halogenated hydrocarbons and other by-product impurities as well as dissolved hydrogen chloride, sulfur dioxide and chlorine. Because of the presence of these impurities, the mixture is unstable and of poor quality both in color and odor. Additionally, upon aging, precipitates form in the mixture, all of which make the mixture difficult to utilize in subsequent reactions. When the crude sulfonyl chloride reaction product is utilized for the preparation of sulfonamides by reacting it with ammonia or amines, the sulfonamides produced are generally of poor quality in color and odor.

Various methods of purifying paraffin hydrocarbon sulfochlorination reaction mixtures have been developed such as extraction with solvents for polar compounds. That is, solvents such as nitroethane methylformate and liquid sulfur dioxide have been used to advantage as selective solvents for separating sulfonyl chloride products from unreacted hydrocarbons, halogenated hydrocarbons and the like. However, the extracted alkane sulfonyl chloride mixture produced still contains impurities and includes all of the various sulfonyl chloride compounds and isomers mentioned above. Due to the similarity in physical properties of the sulfonyl chloride compounds, they cannot be readily separated by conventional methods, and consequently the entire sulfonyl chloride mixture has been employed in industrial applications for the preparation of sulfonamide derivatives. By the present invention, the liquid reaction product obtained by the chlorosulfonation of paraffin hydrocarbons is controlled so that it contains a high percentage of monosulfonyl chloride compounds and a minimum of impurity compounds. The reaction mixture is then reacted with a nitrogen base compound taken from the group consisting of ammonia and amines to form high quality biodegradable alkane sulfonamides.

More specifically, the method of the present invention comprises reacting a straight chain paraffin hydrocarbon containing from about 8 to about 20 carbon atoms with chlorine and sulfur dioxide under the action of ultraviolet light to form a reaction mixture containing a major portion of alkane monosulfonyl chlorides and a minor portion of alkane disulfonyl chlorides and polysulfonyl chlorides. This reaction can be represented as follows:

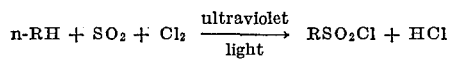

wherein R is a straight chain alkyl group containing from 8 to 20 carbon atoms. In order to avoid making excessive di- and polysulfonyl chloride products, the reaction is carried out in an excess of the normal paraffin hydrocarbon and the conversion is preferably limited to about 40%. That is, the ratio of chlorine to paraffin hydrocarbon is controlled at about 0.4 mole of chlorine per mole of hydrocarbon to produce a conversion of about 40% which results in a relatively low formation of di- and polysulfonyl chloride compounds.

In order to stabilize the crude reaction mixture obtained and to remove impurities therefrom, it is washed with an aqueous solvent such as water or an aqueous solution of sodium carbonate, barium carbonate or other mild base. If an aqueous basic solution is used, a concentration of from about 1% to about 10% by weight base is satisfactory. The insolubility of the alkane sulfonyl chloride compounds in such aqueous solvents allows the removal of soluble impurity compounds, particularly dissolved hydrogen chloride, sulfur dioxide and chlorine gases. An alternate technique which may be employed to remove impurities from the crude reaction mixture is to pass the mixture over an ion exchange resin of sodium, calcium, barium or other alkali metal or alkaline earth metal carboxylate salt. Following the step of removing impurities from the reaction mixture, if required it is dried by contact with a drying agent such as anhydrous sodium carbonate.

If it is desired to separate the alkane monosulfonyl chloride from the di- and polysulfonyl chloride contained in the reaction mixture, this is accomplished in accordance with the present invention by extraction of the reaction mixture with a selective solvent for the more polar di- and polysulfonyl chlorides. That is, the crude stabilized reaction mixture is extracted with a selective solvent such as nitromethane at room temperature. Due to the fact that the alkane di- and polysulfonyl chloride compounds are more polar than the alkane monosulfonyl chloride compounds, the di- and polysulfonyl chloride compounds are readily extracted by the nitromethane. The reaction mixture remaining after the extraction is primarily comprised of alkane monosulfonyl chlorides and excess paraffin hydrocarbon.

The excess paraffin hydrocarbon contained in the extracted reaction mixture may be removed by a conventional distillation step at low pressure, or by a crystallization step using solvents such as nitroethane, sulfur dioxide, etc., in combination with distillation. Alternatively, however, the excess paraffin hydrocarbon may be removed after reacting the mixture to form the alkane sulfonamide compounds. Preferably, the excess normal paraffin compounds are removed by crystallization and distillation prior to the sulfonamide reaction. Specifically, the reaction mixture is mixed with about an equal volume of a selective solvent for sulfonyl chlorides such as nitroethane and the resultant mixture cooled to a temperature effective to cause crystallization of the paraffin hydrocarbon. The mixture is then filtered to remove the crystallized paraffin hydrocarbon material. The steps of cooling and filtering may be repeated to obtain maximum removal of the paraffin hydrocarbon. The selective solvent is next removed from the remaining sulfonyl chloride fraction by conventional distillation carried out at reduced pressure and temperature conditions to prevent decomposition of the sulfonyl chloride compounds.

The purified alkane sulfonyl chloride reaction mixture is next reacted with a nitrogen base compound selected from the class consisting of ammonia and amines to obtain the alkane sulfonamide derivatives. This reaction may be represented as follows wherein ammonia is utilized:

The reaction is carried out by mixing the alkane sulfonyl chloride mixture with a large excess of anhydrous ammonia or amine until the sulfonyl chloride compounds have been reacted. The reaction product is then stripped of excess ammonia or amine and washed with hot water to remove the hydrochloride salt formed followed by drying.

If it is desired to produce unsubstituted alkane sulfonamides, anhydrous ammonia is reacted with the sulfonyl chlorides. If alkyl substituted alkane sulfonamides are desired, the sulfonyl chloride mixture is reacted with an alkyl amine, such as methyl or ethyl amine. The reaction can be represented as follows:

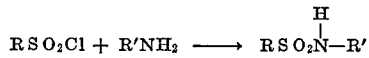

wherein R is a straight chain alkyl group containing 8 to 20 carbon atoms and R' is an alkyl group containing 1 or 2 carbon atoms.

If the formation of alkanol substituted alkane sulfonamides are desired, the unsubstituted alkane sulfonamides formed in the reaction of the sulfonyl chlorides with anhydrous ammonia can be further converted to an alkanol substituted type sulfonamide by condensation with ethylene oxide in the presence of a suitable catalyst at an elevated temperature. Strongly basic catalysts such as sodium hydroxide or sodium methylate can be used in this reaction as well as weakly basic materials such as pyridine. Preferably, however, a tertiary amine such as triethyl amine is used as the catalyst for the reason that the reaction proceeds at considerably lower temperatures than when using other catalysts thereby resulting in products of better color quality, and additionally, a solvent is not required as is the case with most other catalysts. The reaction may be represented as follows:

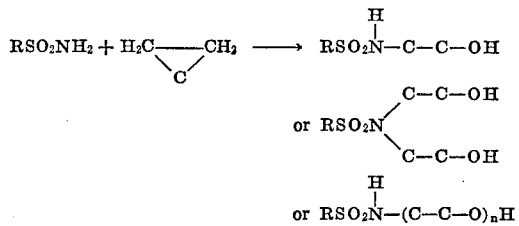

By the improved method of the present invention high quality alkane sulfonamides are produced which are predominantly alkane monosulfonamides wherein the alkane substituent contains from about 8 carbon atoms up through 20 carbon atoms. Further, by the method of the present invention, unsubstituted alkane sulfonamides, alkyl substituted, or alkanol substituted alkane sulfonamides may be produced.

The starting raw material utilized in carrying out the method may be a particular normal paraffin hydrocarbon compound of a chain length from about 8 carbon atoms to about 20 carbon atoms, or a mixture of normal paraffin hydrocarbons having chain lengths from about 8 to about 20 carbon atoms may be employed. The normal paraffin hydrocarbon mixture may be obtained from any petroleum derived mixture relatively high in normal paraffins, such as a petroleum fraction corresponding to a kerosene cut. The kerosene, or other distillate relatively rich in normal paraffin content and containing relatively little olefinic material, can be suitably fractionated to produce a desired fraction of normal paraffinic materials, either through the use of molecular sieves, or by the urea adduction method. Preferably, the paraffin fraction produced consists essentially of normal paraffins ranging in carbon atom content of from $C_8$ to $C_{20}$. The purity of the normal paraffins is important with respect to the quality of the sulfonamide end product obtained. Particularly, all olefins or aromatic hydrocarbon impurities should be removed from the normal paraffin starting material. This may be accomplished by washing the paraffin with oleum prior to the sulfochlorination reaction.

In order to present a clear understanding of the present invention, the following examples are given.

EXAMPLE 1

This example illustrates the sulfochlorination of a normal paraffin hydrocarbon starting material.

2600 grams of normal hexadecane were weighed into a 4 liter resin flask. The hexadecane was first washed with two successive oleum washes in quantities equivalent to 5 weight percent of the hexadecane, followed by an aqueous caustic wash and drying. The resin flask was equipped with a stirrer, thermometer, fritted glass tube extending to the bottom, and a conventional mercury vapor tube. Chlorine and sulfur dioxide gas cylinders were connected to the fritted glass tube through individual conventional flow meters.

Stirring was started, the mercury vapor light turned on and chlorine and sulfur dioxide gas introduction started. Chlorine was introduced at the rate of 137 grams per hour and sulfur dioxide was introduced at the rate of 471 grams per hour. The total reaction time was one hour and forty-seven minutes. The flask was first saturated with sulfur dioxide before the chlorine introduction was begun. The temperature was maintained at 25 to 30° C. throughout the reaction. At the end of the reaction time the crude reaction mixture obtained was purged with nitrogen gas for two hours and transferred to a separatory funnel. In order to stabilize the crude reaction mixture and remove impurities therefrom, the mixture was washed with water three successive times, followed by stirring with 50 grams of anhydrous sodium carbonate. The reaction mixture was then dehydrated by filtering over anhydrous sodium sulfate. The crude stabilized reaction mixture had the following approximate composition.

| Component: | Weight percent |
|---|---|
| Hexadecane monosulfonyl chloride | 27 |
| Hexadecane di- and polysulfonyl chloride | 3 |
| Unreacted excess hexadecane | 70 |

EXAMPLE 2

This example illustrates the purification of the hexadecane monosulfonyl chloride contained in the crude stabilized reaction mixture from Example 1.

Separation of di- and polysulfonyl chlorides

The crude stabilized reaction mixture was extracted with 4 successive portions of nitromethane at room temperature. A quantity of nitromethane equivalent to 5% by weight of the crude reaction mixture was utilized in each extraction. The extracts were combined and the nitromethane evaporated to give a fraction rich in di- and polysulfonyl chlorides. The remaining reaction mixture rich in alkane monosulfonyl chlorides was freed of nitromethane solvent by evaporation.

Deparaffinization

The extracted reaction mixture remaining from above was mixed with an equal volume of nitroethane. The mixture was then cooled with stirring to a temperature of from about −5° C. to about +5° C. which caused the excess hexadecane to crystallize. The mixture was filtered on a chilled filter to remove the crystallized hexadecane. The nitroethane solvent was then evaporated from the liquid alkane sulfonyl chloride fraction remaining after the removal of the hexadecane therefrom. The evaporation was carried out under reduced pressure conditions of from about 2 to about 4 millimeters of mercury at a maximum temperature of 65° C. to prevent thermal decomposition of the sulfonyl chloride compounds. A small quantity of barium carbonate was added to the distillation flask to further stabilize the product. The remaining mixture consisting of hexadecane monosulfonyl chlorides substantially free of unreacted hexadecane and hexadecane di- and polysulfonyl chlorides.

EXAMPLE 3

This example illustrates the preparation of unsubstituted alkane sulfonamides from the purified hexadecane monosulfonyl chlorides from Example 2.

Approximately 500 milliliters of anhydrous ammonia were condensed in a two-liter three necked flask. The flask was cooled by immersion in a bath containing a Dry Ice-isopropyl alcohol mixture. The flask was equipped with a stirrer, thermometer, addition funnel and a Dry Ice-acetone condenser. 315 grams of the hexadecane monosulfonyl chloride from Example 2 above were added to the flask over a period of one and three-quarter hours with stirring. After the addition of the hexadecane monosulfonyl chloride was completed the mixture was stirred for an additional one-half hour. Excess anhydrous ammonia was then removed by evaporation and the product slurry was washed three times with 500 milliliters of dry pentane. The combined pentane extracts were filtered and the pentane was removed with a rotary evaporator. The final unsubstituted sulfonamide product (290 grams) was very light colored and odorless. A non-aqueous titration showed the final product to be 93.8% active hexadecane sulfonamide.

EXAMPLE 4

The following example illustrates the ethoxylation of the sulfonamide produced in Example 3 to produce an alkanol substituted alkane sulfonamide product.

The hexadecane monosulfonamide product from Example 3 was placed in a one-liter three necked flask containing a fritted glass bottom inlet for gas introduction. 25 grams of triethylamine catalyst was added to the flask and the mixture was heated to a temperature of 80° C. 95 grams of ethylene oxide were next introduced into the flask over a period of two hours and twenty minutes. The resulting reaction product was evaporated under a vacuum to a constant weight. Analysis of the product showed no unsubstituted sulfonamide remaining and that the alkanol substituted alkane sulfonamide product was approximately 30% monosubstituted and 70% disubstituted. The product was of high quality and odorless.

While the examples illustrate the improved method of the present invention utilizing a single normal paraffin hydrocarbon starting material, it will be understood by those skilled in the art that the method is equally applicable to mixtures of two or more normal paraffin hydrocarbons of varying chain lengths, and as heretofore described, a mixture of normal paraffin hydrocarbons obtained from kerosene or other petroleum distillates or fractions may be utilized. Further, while particular embodiments of the invention have been described, it will be understood that the invention is not limited thereto since many modifications may be made by those skilled in the art. Such modifications as fall within the true spirit and scope of the invention as defined by the appended claims and reasonable equivalents thereto are included as a part thereof. For example, the various purification steps may be carried out in the order described or in different order and may or may not be utilized, depending upon the final sulfonamide product desired.

What is claimed is:

1. A method of preparing high quality biodegradable alkane sulfonamides comprising the steps of:
    reacting a normal paraffin hydrocarbon containing from 8 to 20 carbon atoms with chlorine and sulfur dioxide under the action of ultraviolet light to form a reaction mixture containing a major portion of alkane monosulfonyl chloride, a minor portion of alkane disulfonyl chlorides and polysulfonyl chlorides, unreacted normal paraffin hydrocarbons and impurity compounds;
    washing said reaction mixture with an aqueous solvent to remove said impurity compounds and stabilize said reaction mixture;
    dehydrating said washed reaction mixture;
    removing said unreacted normal paraffin hydrocarbon from said mixture; and
    reacting the resulting mixture of alkane sulfonyl chlorides with a nitrogen base compound selected from the group consisting of ammonia and amines to obtain a high quality product mixture comprised of linear alkane sulfonamides.

2. The method of claim 1 wherein the normal paraffin hydrocarbon is a mixture of normal paraffin hydrocarbons containing from 8 to 20 carbon atoms obtained from a petroleum source.

3. The method of claim 1 wherein the aqueous solvent utilized for washing said reaction mixture is selected from the group consisting of water and an aqueous solution of a mild base such as sodium carbonate.

4. The method of claim 3 wherein the step of dehydrating said washed reaction mixture comprises contacting a drying agent with said washed reaction mixture to remove water therefrom.

5. The method of claim 4 wherein the drying agent is anhydrous sodium carbonate.

6. The method of claim 1 wherein the step of removing unreacted paraffin hydrocarbon from said reaction mixture comprises the steps of:
    combining about an equal volume of a selective solvent for alkane sulfonyl chlorides with said reaction mixture;
    cooling the combined mixture to a temperature effective to cause the crystallization of the normal paraffin hydrocarbons contained therein;
    separating the crystalline paraffin hydrocarbon material from the remaining mixture containing alkane sulfonyl chloride; and
    evaporating the selective solvent from the mixture containing alkane sulfonyl chlorides under reduced pressure and temperature conditions.

7. The method of claim 6 wherein the selective solvent for alkane sulfonyl chlorides is selected from the group consisting of nitromethane, methyl formate and liquid sulfur dioxide.

8. The method of claim 7 which is further characterized to include the additional step of reacting said product mixture of alkane sulfonamides with ethylene oxide in the presence of a tertiary amine catalyst to form a product mixture of ethanol substituted alkane sulfonamides.

9. The method of claim 8 wherein the catalyst is triethyl amine.

10. The method of claim 1 which is further characterized to include the step of removing a major portion of the alkane disulfonyl and polysulfonyl chlorides following dehydrating said washed reaction mixture by: extracting said washed and dehydrated reaction mixture with a selective solvent for highly polar alkane sulfonyl chloride compounds; and evaporating the selective solvent from the remaining mixture.

11. The method of claim 10 wherein the selective solvent for highly polar alkane sulfonyl chlorides is nitromethane.

12. The method of claim 11 wherein the step of removing unreacted paraffin hydrocarbons from said reaction mixture comprises the steps of:
    combining about an equal volume of a selective solvent for alkane sulfonyl chlorides with said reaction mixture.
    cooling the combined mixture to a temperature effective to cause the crystallization of the normal paraffin hydrocarbon contained therein;
    separating the crystalline paraffin hydrocarbon material from the remaining mixture containing alkane sulfonyl chlorides; and
    evaporating the selective solvent from the remaining mixture under reduced pressure and temperature conditions.

13. The method of claim 12 wherein the selective solvent for alkane sulfonyl chlorides is selected from the group consisting of nitromethane, methyl formate and liquid sulfur dioxide.

14. The method of claim 13 which is further characterized to include the additional step of reacting said product mixture of alkane sulfonamides with ethylene oxide in the presence of a tertiary amine catalyst to form a product mixture of ethanol substituted alkane sulfonamides.

15. The method of claim 14 wherein the catalyst is triethyl amine.

16. A method of preparing high quality biodegradable alkane sulfonamides comprising the steps of:
    reacting a normal paraffin hydrocarbon containing from 8 to 20 carbon atoms with chlorine and sulfur dioxide under the action of ultraviolet light to form a reaction mixture containing a major portion of alkane monosulfonyl chloride, a minor portion of alkane disulfonyl chlorides and polysulfonyl chlorides, unreacted normal paraffin hydrocarbons and impurity compounds;
    passing said reaction mixture over an ion exchange resin of an alkali metal or alkaline earth metal carboxylate salt;
    dehydrating said ion exchange resin treated reaction mixture;
    removing said unreacted normal paraffin hydrocarbon from said mixture; and
    reacting the resulting mixture of alkane sulfonyl chlorides with a nitrogen base compound selected from the group consisting of ammonia and amines to obtain a high quality product mixture comprised of linear alkane sulfonamides.

References Cited

Paraffin, Chemistry & Technology, Pergamon Press (1968), F. A. Singer, pp. 483, 488–493, 501. 503–509, 514, 528–541, 553–558.

Advances in Organic Chemistry, 5:2–3 (1965), Parker, "The Use of Dipolar Aprotic Solvents in Organic Chemistry."

ALAN L. ROTMAN, Primary Examiner

S. D. WINTERS, Assistant Examiner

U.S. Cl. X.R.

260—543 R